United States Patent [19]
Thomas et al.

[11] Patent Number: 5,988,565
[45] Date of Patent: Nov. 23, 1999

[54] OVERHEAD AIRCRAFT LUGGAGE BIN WITH SAFETY MECHANISM

[75] Inventors: Benjamin Hall Thomas, San Antonio, Tex.; Calvin Mackie, New Orleans, La.

[73] Assignee: Kingdom Builders R & D, L.L.C., New Orleans, La.

[21] Appl. No.: 09/030,215

[22] Filed: Feb. 25, 1998

[51] Int. Cl.⁶ .................................................. B64D 11/00
[52] U.S. Cl. .................................. 244/118.1; 244/118.5; 312/291
[58] Field of Search .............................. 244/118.1, 118.5, 244/121, 129.4, 129.5; 312/291, 292, 293.1, 247; 160/273.1, 27

[56] References Cited

U.S. PATENT DOCUMENTS

| | | | |
|---|---|---|---|
| 797,652 | 8/1905 | Wilson et al. | 160/273.1 |
| 4,014,329 | 3/1977 | Welch et al. | 128/214 R |
| 4,073,452 | 2/1978 | Gosau | 244/121 |
| 4,637,642 | 1/1987 | Stoecker | 292/129 |
| 4,813,753 | 3/1989 | Relyea | 312/291 |
| 4,907,762 | 3/1990 | Bock et al. | 244/118 |
| 5,035,471 | 7/1991 | Ackerman | 312/291 |
| 5,244,269 | 9/1993 | Harriehausen et al. | 312/247 |
| 5,383,628 | 1/1995 | Harriehausen et al. | 244/118.1 |
| 5,549,258 | 8/1996 | Hart et al. | 244/118.1 |
| 5,590,851 | 1/1997 | Ackerman | 244/118.1 |
| 5,823,472 | 10/1998 | Luria | 244/118.5 |
| 5,868,353 | 2/1999 | Benard | 244/121 |

FOREIGN PATENT DOCUMENTS

4018362  12/1991  Germany .............................. 244/118.1

*Primary Examiner*—Galen L. Barefoot
*Attorney, Agent, or Firm*—Price, Heneveld, Cooper, DeWitt & Litton

[57] ABSTRACT

A safety mechanism for an overhead aircraft luggage bin for preventing baggage from falling from the bin when the door cover of the bin is opened. The safety mechanism includes a roll-up screen mounted on the door cover which cooperates with a latch mounted on the lower edge of the opening to the bin. The latch and roll-up screen mechanism are operatively associated whereby when the door cover is in covered or closed position, the screen is rolled up and latched to the latch. When the door cover is moved to the uncovered position the screen is unrolled and covers the opening to the bin to prevent any luggage from falling from the housing. The screen can be unlatched so as to remove the screen from the opening.

19 Claims, 7 Drawing Sheets

OVERHEAD AIRCRAFT LUGGAGE BIN WITH SAFETY MECHANISM

This invention relates to an overhead aircraft luggage bin with a novel safety mechanism for preventing luggage from falling from the bin when the door cover of the bin is opened.

BACKGROUND OF THE INVENTION

Passenger aircraft generally include overhead storage/luggage bins mounted on the ceiling of the aircraft above the passenger seats. Passengers store all sorts of baggage and other items in these bins which are provided with a door cover to prevent the luggage and other items from falling out of the bins. Objects which are stored in these bins are such items as lap top computers, luggage carriers, briefcases, and other objects.

In commercial passenger aircraft, passengers frequently stuff luggage and other objects into the bins and then quickly close the door which generally opens upwardly so as not to impinge upon the movement of the passengers and crew. Further, such baggage and other objects in the bin have a tendency to reshuffle during the flight due to turbulence, take-offs and landings. Therefore, a major safety problem for commercial aircraft is injury to the passengers caused by the unrestrained luggage and other items falling from the overhead bins and injuring passengers. The injuries range from bumps on the head to scalp lacerations, and in accordance to one newspaper report has already resulted in thousands of lawsuits or claims. Most of these accidents are incurred by passengers in the isle seats which is a preferred seat for many passengers but is a hazardous place to sit.

Many efforts have been made to solve this problem. An example of one arrangement is U.S. Pat. No. 5,035,471 entitled SAFETY ARRANGEMENT FOR OVERHEAD LUGGAGE BINS IN AIRCRAFT PASSENGER CABINS. Despite efforts that have been made, no suitable solution has been discovered particularly as pertains to mechanism that can serve as retrofits of existing overhead bins already installed in the aircraft.

SUMMARY OF THE INVENTION

In accordance with this invention, we provide a unique safety mechanism in combination with an overhead aircraft luggage bin. This safety mechanism can be incorporated within newly manufactured overhead aircraft luggage bins or also could be installed on existing bins as an interfit. The mechanism is constructed of very few parts easily interfitted on existing aircraft overhead bins.

More specifically, the mechanism comprises a spring biased roll-up screen mounted on the door cover which cooperates with a latch mounted on the housing of the bin. The latch and roll-up screen mechanism are operatively associated whereby when the door cover is in the covered or closed position, the screen is rolled up and latched to the latch. When the cover door is moved to the uncovered position the screen is unrolled and covers the opening to the bin to prevent any luggage from falling from the housing. The end of the screen is adapted to be unlatched from the latch by the passenger or aircraft crew, in which event, the screen is automatically rolled up uncovering the opening to the bin. The screen is a see-through member preferably a net so that the passenger or crew member can observe any luggage that might fall out of the bin before the screen is rolled up thus permitting the passenger or crew member to prevent the luggage or other objects from falling out of the bin and injuring someone.

More specifically, the spring biased roll-up screen mechanism includes a spring biased rotatable rod with the screen rolled on the rod and the free end of the screen includes an elongated rigid member which when the door cover is closed, latches onto the latch. A release mechanism is provided for selectively unlatching the roll-up screen mechanism from the latch when the door is moved to uncovered position. Thus, when the release mechanism is actuated, the screen is caused to roll up on the rod to substantially uncover the opening.

The spring biased rod of the screen roll-up mechanism is mounted on the cover door adjacent the lower edge. A rigid member attached to the free end of the screen is caused to latch onto the latch located at the lower edge of the bin opening. Thus, when the cover door is pulled off the screen roll-up mechanism and is opened the screen is caused to extend over the opening as the cover door is opened until released by the passenger or crew of the aircraft.

In a more specific aspect of this invention the rigid member attached to the free end of the screen is a screen release member having elongated pins located at the ends of such member. The pins are spring biased outwardly and in a longitudinal direction. These pins engage the ramp of a retainer member which forces the pins to move longitudinally inwardly of the sleeve until the pin aligns with a retainer opening in the retainer member at which time the pins bias longitudinally outwardly into the retainer opening to latch the screen release member to the retainer member of the latch.

In still another aspect of this invention is the provision for a guardrail provided adjacent the lower edge of the bin opening for receiving and protecting the screen release member from the luggage in the bin. The latch including the retainer member is located in the ends of the guardrail. Further, a roll-up screen mechanism is mounted in a guard which includes a part for positioning the screen release member in the proper position to be received and latched within the guard rail when the door cover is moved to covered position.

Having briefly described the various aspects of our invention, the intended advantages and understanding of our invention will become more readily appreciated and understood by those skilled in the art to the following specification, claims and appended drawings.

DETAILED DESCRIPTION OF PREFERRED EMBODIMENT

Figures 1, 1A, 1B:
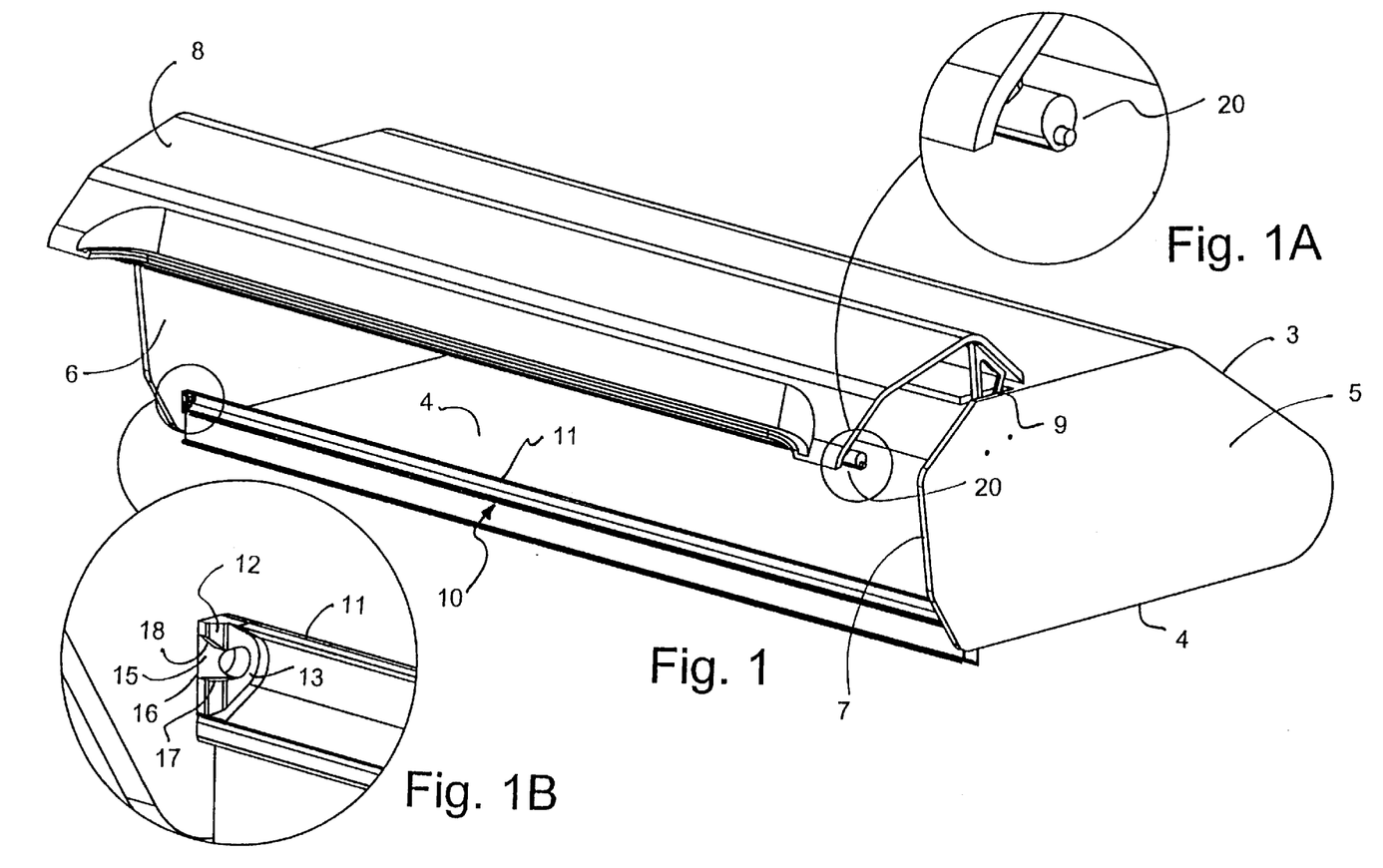
FIG. 1 is a front elevational, perspective view of an overhead aircraft luggage bin in which our invention is incorporated.
FIG. 1A is an enlarged view of one part of the luggage bin of FIG. 1.
FIG. 1B is an enlarged view of another part of the luggage bin of FIG. 1.
Figures 2, 2A:
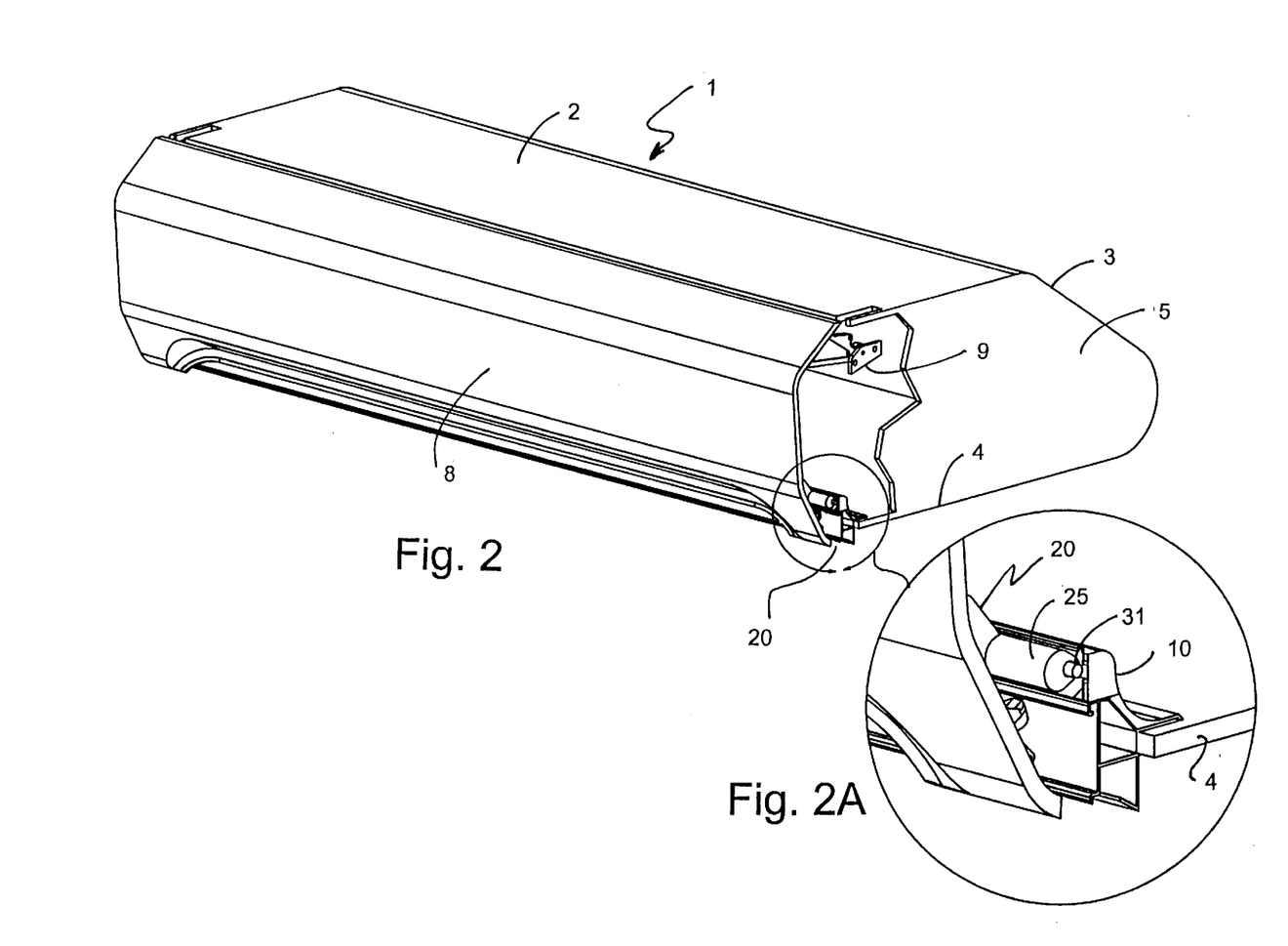
FIG. 2 is a front elevational, perspective view of the luggage bin of this invention disclosing the door cover in closed position and including cut-away portions thereof.
FIG. 2A discloses an enlarged part of the bin of FIG. 2.
Figure 3:
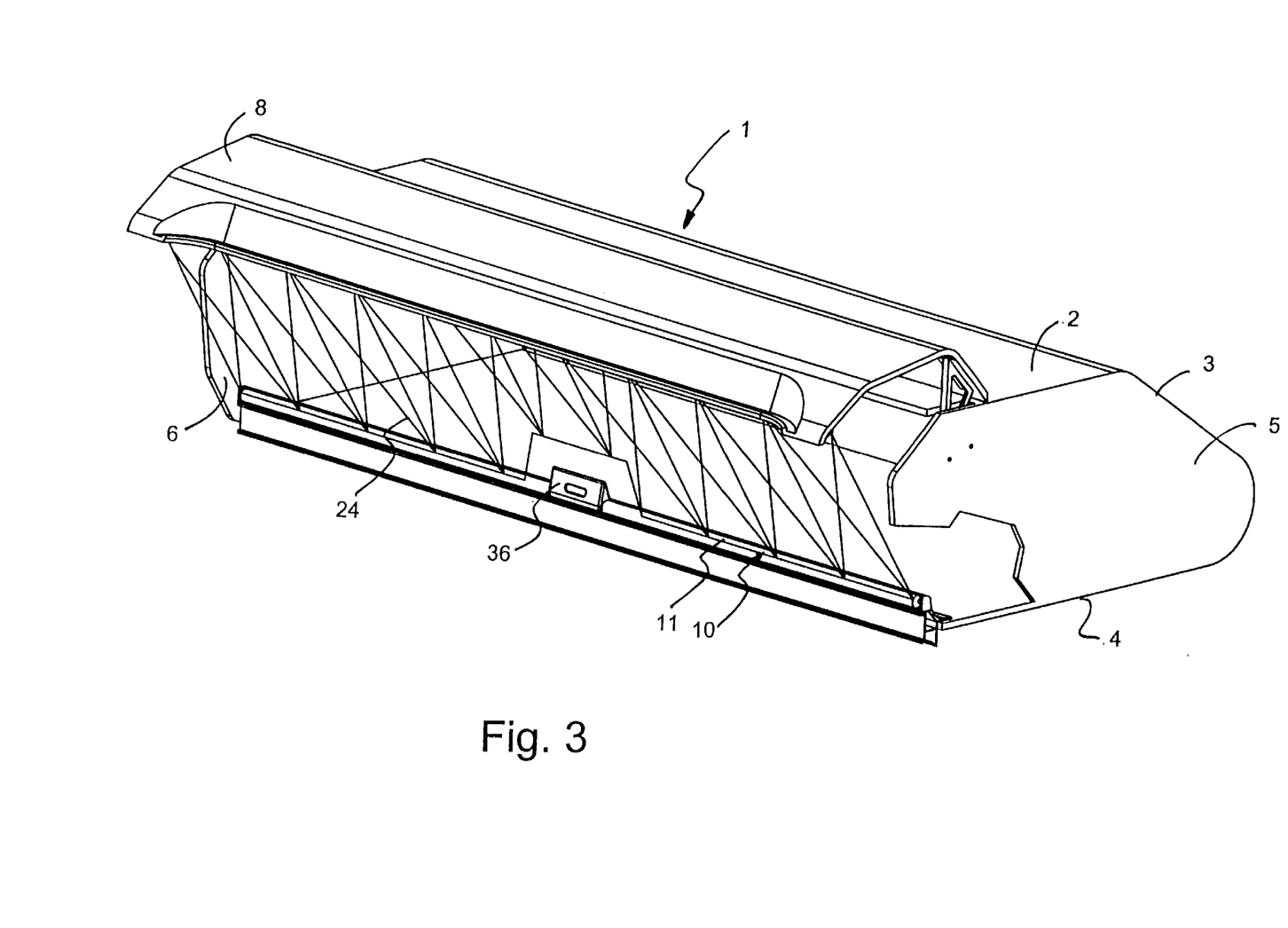
FIG. 3 is a front elevational, perspective view of the luggage bin of our invention with the cover door open and the safety screen in position to prevent luggage and other objects from falling out of the bin.

Referring to the drawings, FIGS. 1, 2, and 3 disclose the overall luggage bin in which is incorporated the safety mechanism of our invention which includes the guardrail assembly 10 disclosed in greater detail in FIGS. 1, 1B, 7, 8A–8C, the spring biased roll-up screen assembly 20 disclosed in greater detail in FIGS. 1A, 2A, 5, 6, 9A, 9B, and 9C. Except for the guardrail assembly 10 and spring biased roll-up screen assembly 20, bin 1 is of a conventional construction which includes the top panel 2, the rear panel 3, the bottom panel 4, the ends 5 and 6, and the opening 7 over which the cover door 8 is pivotally provided along the forward edge of the top panel 2 by the hinge 9 for selectively providing access to the inside of the bin or for covering the opening when the baggage is stored within the bin. A well-known mechanism (not shown) is provided for latching the door into a closed position and for releasing the same by the passenger or crew of the aircraft. Such mechanism is not disclosed since to do so would tend to obscure the structure of the safety mechanism of the present invention.

Figures 5, 6:
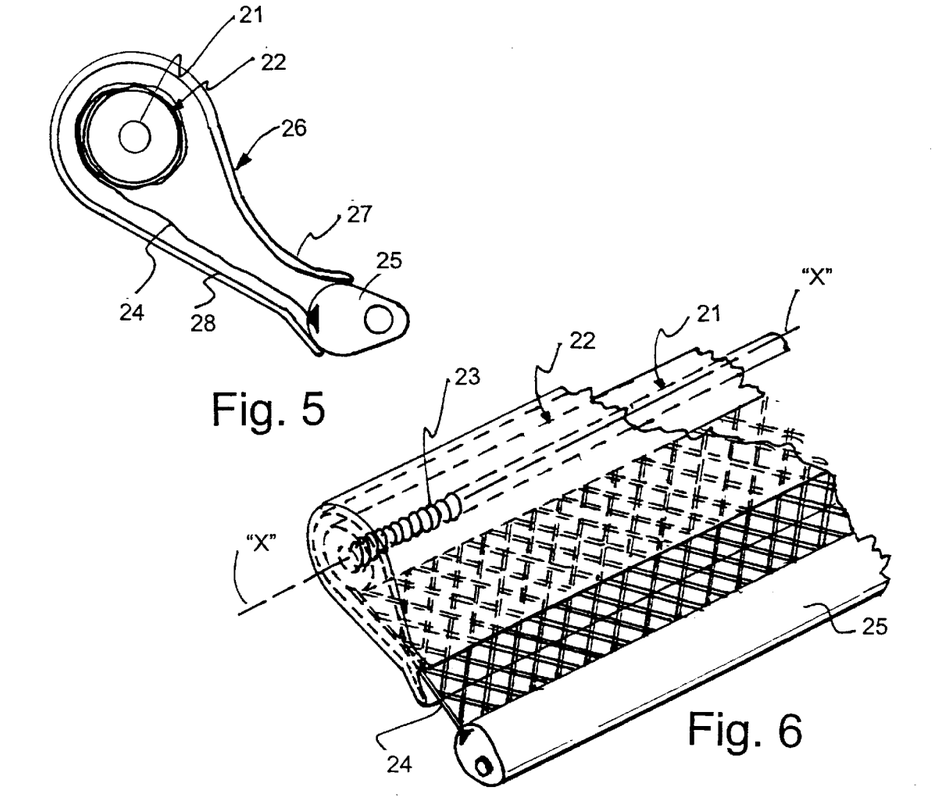
FIG. 5 discloses a sketch demonstrating the relative position of the screen release bar and the screen retractor guard when the cover door is in the open position as disclosed in FIG. 4A.
FIG. 6 is a sketch of the relationship between the screen release bar and the screen retractor guard as they are being separated as disclosed in FIG. 4C.

As previously disclosed, the spring biased roll-up screen assembly is best disclosed in FIGS. 2A, 5, and 6. As disclosed in FIGS. 5 and 6, assembly 20 includes a screen or net retractor 21 which comprises the rod 22 which is rotatably spring biased by spring 23 about the axis "X" so as to roll up the screen 24 on the retractor rod 22. The screen is preferably constructed of a plastic, see-through net. The free end of the net is attached to a screen of net release bar 25. A net retractor guard 26 is provided to shield the net on the retractor rod. It includes a downwardly extended end 27 shaped to receive a portion of the net release bar 25 as disclosed in FIG. 5. It also contains a section 28 that functions to guide the screen or net 24 from the nose 27 to the retractor rod 22. It should be evident from the above description that the net retractor rod 22 is consistently urging the net to be rolled up on the rod 22 by means of the spring 23 which is rotatably biasing rod 22 in a clockwise direction. Therefore, if nothing is holding the net release bar 25, the net retractor rod 22 pulls the screen causing the net release bar 25 to be pulled into the nose 27 of the guard 26.

Figure 9A:
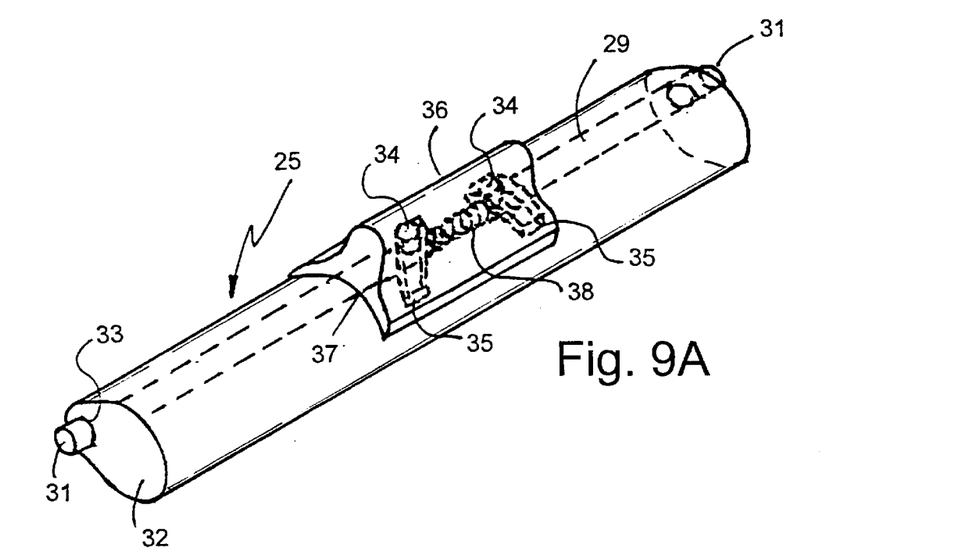
FIG. 9A is a front elevational, perspective view of the screen release bar of this invention.
Figures 9B, 9C:
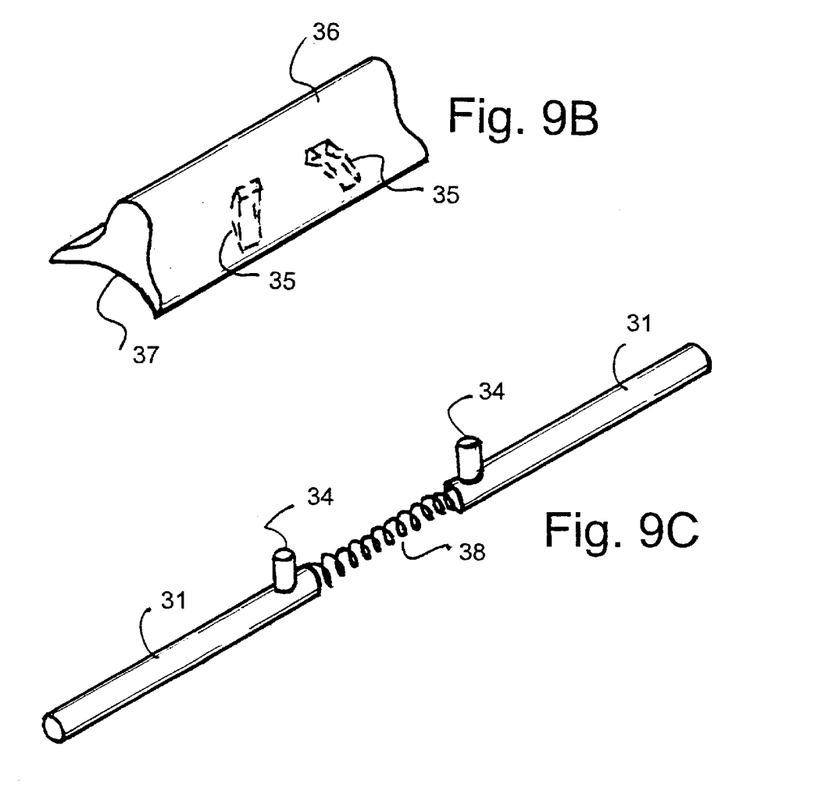
FIG. 9B is an elevational, perspective view of the release handle which forms a part of the screen release bar.
FIG. 9C is a sketch of the locking pins located within the sleeve of the screen release bar of FIG. 8A.

As disclosed in FIGS. 9A, 9B, and 9C, the net release bar 25 includes an egg-shaped sleeve 29 in which is longitudinally mounted a retractor pin assembly comprising the two pins 31 extending outwardly of the end walls 32 of sleeve 29 through the openings 33. Each of the pins 32 have radially extending studs 34 extending into the guide slots 35 of the handle 36 which has an arcuate base 37 fitted over the arcuate surface of the egg-shaped sleeve 29. The two pins 31 are biased outwardly by the spring 38 located between the inner ends of the pins 31. As a result of this structure, the actuation of the handle causes the pins 34 to be forced inwardly by slots 35 against the bias of spring 38 thus retracting the pins 31 inwardly.

The guardrail assembly 10 includes the rail 11 shaped to receive the screen or net release bar 21 and latch the bar so that when the cover door 8 is opened the screen is caused to extend over the opening 7 as disclosed in FIG. 3. The guided rail assembly includes the rail 11 and the end retainer members 12 which in cooperation with the net release bar 25 provides a latch located along the lower edge of the opening 7. Each retainer member 12 includes a cavity 13 and an opening 14 extending therefrom. A ramp 15 is provided leading from the outermost edge 16 of the end retainer member 12 to the opening 14. Side walls 17 and 18 are provided on each side of the ramp for the purpose of guiding pins 31 from the outermost edge 16 into the openings 14. Rail 11 is constructed of a plastic material whereas the end retainer members 12 are preferably constructed of a harder material such as aluminum.

Figure 7:
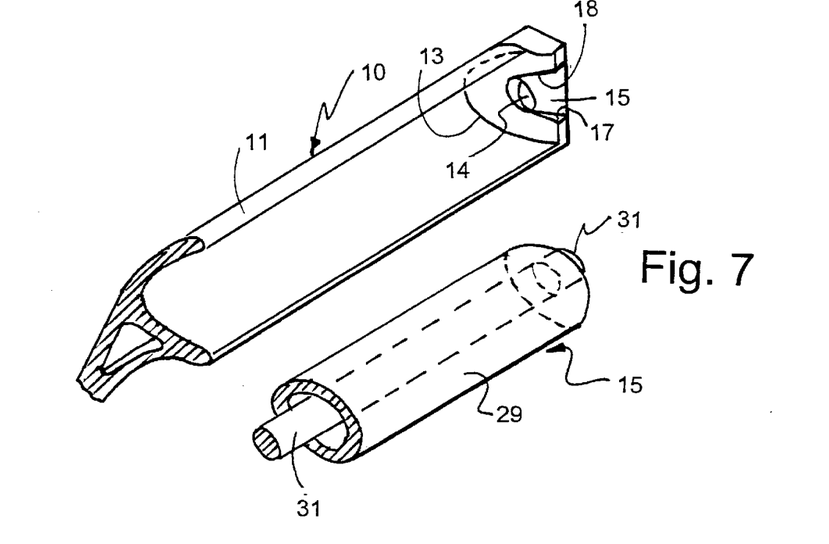
FIG. 7 is a sketch of portions of the guardrail assembly and the screen release bar.
Figure 8A:
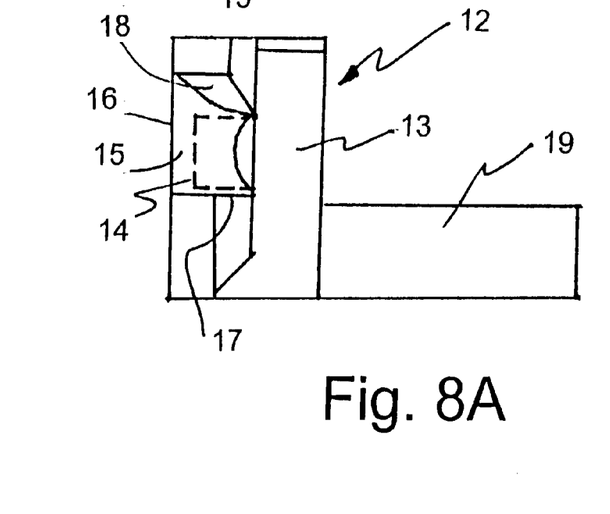
FIG. 8A is a front elevational view of one of the retainer members of the guardrail assembly removed from one end of the guardrail.

Protrusion 19 is provided to extend into an opening (not shown) in the end of the rail 11 for securing the end retainer members 12 to the ends of the rail 11. It should be understood that the end retainer members 22 are adapted for receiving the pins 31 which engage the ramps 16 forcing the pins 31 inwardly against the bias of the spring 38 until the pins 31 reach the openings 14 at which time the pins 31 are forced outwardly by spring 28 into the openings 14 thus latching the net release bar to the guardrail assembly.

It should be understood that the guardrail assembly 10 not only provides for a latching of the net release bar 25 to the bottom edge of the opening 7, but also another important function of the guardrail assembly 10 is to protect the net release bar 25 from the luggage.

OPERATION

Figure 4A:
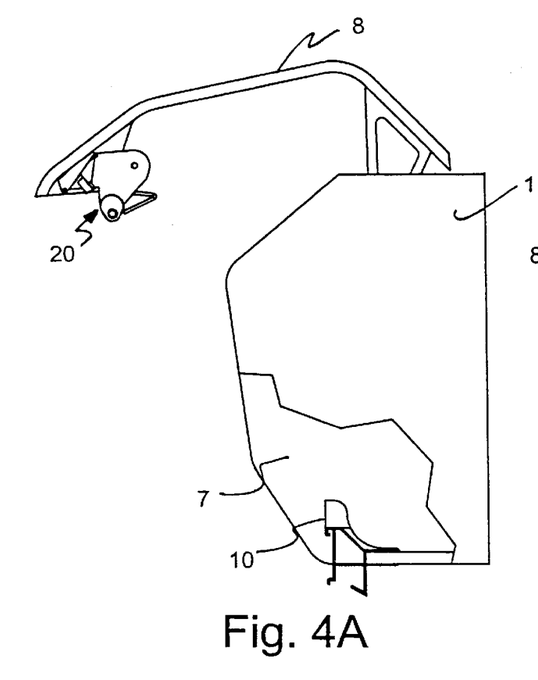
FIGS. 4A, 4B, 4C, and 4D disclose various positions of the cover door and safety net.

Having described the details of the various components of this invention, the operation should be evident. FIGS. 4A, 4B, 4C, and 4D disclose the sequence of the operation. FIG. 4A discloses the cover door 8 in open position with the spring biased roll-up screen assembly 20 mounted at the lower edge of cover door 8 and with the net release bar 25 in the position of FIG. 5, that is, with it located within the nose 27 of the net retractor guard 26. In this uncovered position of door 8, bin 1 is in condition for receiving luggage and other articles that are to be stored in the bin by the passengers.

Figure 4B:
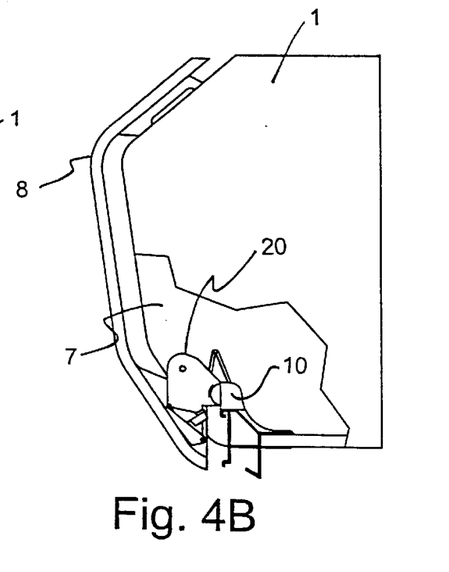
Figure 8B:
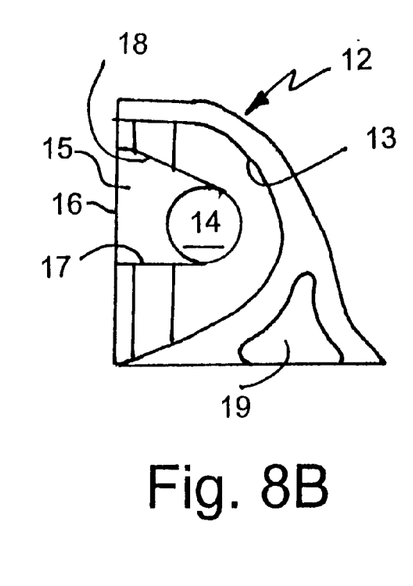
FIG. 8B is a side elevational view of the retainer member of FIG. 8A.
Figure 8C:
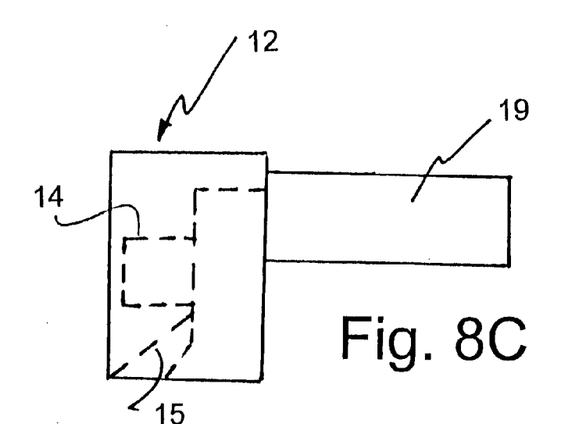
FIG. 8C is a top plan view of the retainer member of FIGS. 8A and 8B.

After the bin is loaded, the cover door 8 is closed as represented by FIG. 4B. In this position the net release bars 25 are latched into the retainer members 12. This is accomplished by the net release bars 25 entering into the cavities 13 and pines 31 engaging the ramp 15, the pins being guided between the two guide walls 17 and 18 (FIG. 8B). When engaging the ramp 15, the pins 31 are forced inwardly as above described until they reach the openings 14 at which time the spring 38 (FIG. 9C) forces the pins 31 into the openings 14 so as to latch the net release bar 25 to the guardrail assembly 10. The cover door 8 is held closed by well-known latching means (not shown) until such time as the passenger or crew member desires to open the cover door and remove its luggage or other articles.

Figure 4C:
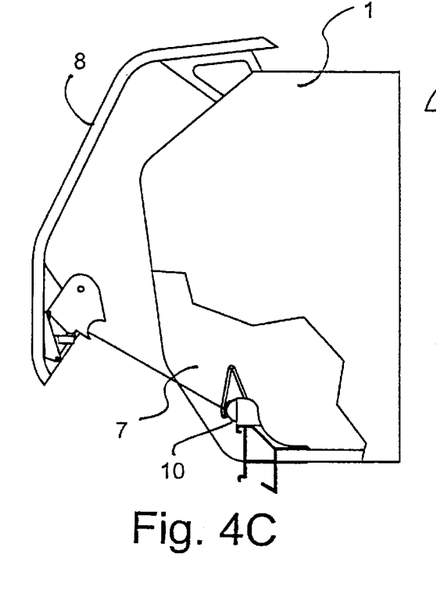
Figure 4D:
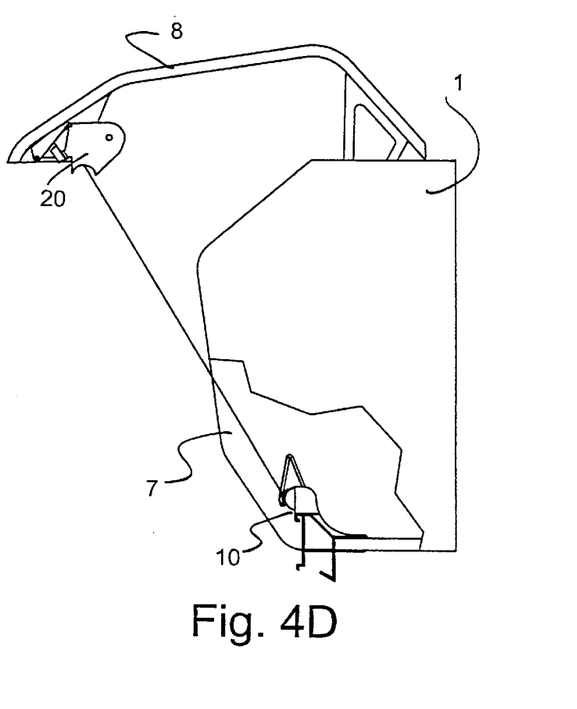

Upon opening door 8 as disclosed in FIG. 4C, the screen release bar 25 is retained within the guardrail assembly 10 by reason of the end retainer members 12 capturing pins 31 within the openings 14 as above described. As a result of the net release bar 25 being retained or latched to the guardrail assembly 10, as the door 8 is opened the screen or net 24 is pulled off the spring biased retractor rod 22 thus causing net 24 covering the opening 7 to restrain any luggage or other articles from falling out of the bin 1.

As previously described, the passengers or crew members desiring to remove their luggage or articles from the bin actuate the release handle 36 mounted on the net release bar 25. In the actuation of the release handle 36, the studs 34 riding in the guide slots 35 cam the pins 31 longitudinally inwardly of the ends of the sleeve—thus camming the pins 31 out of the openings 14 causing the spring biased screen or net retractor to roll the screen up onto the retractor rod 22 to the position as disclosed in FIG. 4A.

It should be understood that although we have described the preferred embodiment of this invention, it is well within the skill of one skilled in the art to make modifications thereof without departing from the spirit of the invention as is set forth in the appended claims.

The invention claimed is:

1. An overhead aircraft luggage bin having a housing with a bin opening for receiving and removing luggage;
    a door cover for covering said opening, said door cover being movable to covered and uncovered positions with respect to said opening;
    a safety mechanism for preventing luggage from falling from said housing when said door cover is movable from covered to uncovered position, said safety mechanism comprising:
        a roll-up screen mechanism mounted on one of said door cover and housing, said mechanism including a rotatable rod and a screen rolled up on said rod;
        a latch mounted on one of said housing and door cover;
        said latch and roll-up screen mechanism being operatively associated whereby when said door cover is moved to said covered position with said screen rolled up, said roll-up screen mechanism is latched to said latch and subsequently when said cover door is moved to uncovered position said screen is unrolled from said rod to cover said opening; and
        a release mechanism for selectively unlatching said roll-up screen mechanism from said latch when said door is moved to uncovered position whereby said screen is rolled up on said rod to substantially uncover said opening.

2. The overhead aircraft luggage bin of claim 1 in which said screen is a see-through net.

3. The overhead aircraft luggage bin of claim 1 in which said cover door when closed includes an upper edge and a lower edge, said cover door being pivoted to said housing adjacent said upper edge; said rod and screen of said roll-up screen mechanism is mounted on said cover door adjacent said lower edge;
    said roll-up screen mechanism including a screen release member arranged on said door cover for latching to said latch when said cover door is moved to covered position over said opening;
    said screen having a free end attached to said screen release member; and
    said rod capable of being pulled away from said screen release member as said door cover is moved to uncovered position at which time said screen is unrolled from said rod.

4. The overhead aircraft luggage bin of claim 3 in which said screen release member is provided with a release mechanism to selectively unlatch said screen release member from said latch.

5. The overhead aircraft luggage bin of claim 1 in which said screen has a free end capable of being pulled away from said rod as said screen is unrolled from said rod, said free end being urged to roll up on said rod; and
    a screen release member at the free end of said screen for latching on to said latch.

6. The overhead aircraft luggage bin of claim 5 in which said screen release member is elongated and attached to the free end of said screen;
    elongated pins located at the ends of said elongated release member, said pins being spring biased outwardly in a longitudinal direction; and
    an actuator for retracting said pins against the spring bias for unlatching said release member from said latch.

7. The overhead aircraft luggage bin of claim 6 in which said release member comprises a sleeve to which said free end of said screen is attached and said pins are slidable in the ends of said sleeve and protrude outwardly therefrom;
    a spring in said sleeve between said pins; and
    actuating means for applying a force on said pins against the bias of said spring to retract said pins for unlatching said release member from said latch.

8. The overhead aircraft luggage bin of claim 7 in which said latch includes a retainer member having a ramp leading to a retainer opening for receiving said pin; and
    said ramp being arranged to cause said pin when forced against said ramp to force said pin to move longitudinally inwardly of said sleeve until said pin aligns with said retainer opening at which time said pin is biased longitudinally outwardly into said retainer opening.

9. The overhead luggage bin of claim 3 in which a guardrail is provided adjacent the lower edge of said bin opening for receiving and protecting said screen release member.

10. The overhead luggage bin of claim 3 in which said roll-up screen mechanism is mounted in a guard.

11. The overhead luggage bin of claim 10 in which a guardrail is provided adjacent the lower edge of said bin opening for receiving and protecting said screen release member; said guard providing a part for positioning said screen release member to be received within said guardrail when said door cover is moved to covered position.

12. The overhead luggage bin of claim 11 in which said latch includes latch members located at each end of said guardrail.

13. The overhead luggage bin of claim 5 in which a guardrail is provided adjacent the lower edge of said bin opening for receiving and protecting said screen release member.

14. The overhead aircraft luggage bin of claim 13 in which said screen release member is elongated and attached to the free end of said screen;
    elongated pins located at the ends of said elongated screen release member, said pins being spring biased outwardly in a longitudinal direction to latch onto said latch; and
    an actuator for retracting said pins against the spring bias for unlatching said release member from said latch.

15. The overhead aircraft luggage bin of claim 13 in which said release member comprises a sleeve to which said free end of said screen is attached and said pins are slidable in the ends of said sleeve and protrude outwardly therefrom;

a spring in said sleeve between said pins; and actuating means for applying a force on said pins against the bias of said spring to retract said pins for unlatching said release member from said latch.

16. The overhead aircraft luggage bin of claim 14 in which said latch includes retainer members on each end of said guardrail, said retainer members each having a ramp leading to a retainer opening for receiving one of said pins; and said ramp being arranged to cause said pins when forced against said ramp to force said pins to move longitudinally inwardly of said sleeve until said pins align with said retainer openings at which time said pins are biased longitudinally outwardly into said retainer openings.

17. The overhead luggage bin of claim 5 in which said roll-up screen mechanism is mounted in a guard.

18. The overhead luggage bin of claim 17 in which a guardrail is provided adjacent the lower edge of said bin opening for receiving and protecting said screen release member; said guard providing a part for positioning said screen release member to be received within said guardrail when said door cover is moved to covered position.

19. The overhead luggage bin of claim 17 in which said guard includes a part for positioning said screen release member to latch onto said latch when the door is moved to covered position.

\* \* \* \* \*